(12) United States Patent
Alizadeh-Shabdiz

(10) Patent No.: US 10,317,507 B2
(45) Date of Patent: *Jun. 11, 2019

(54) TECHNIQUES FOR ESTIMATING A POSITION OF A USER DEVICE USING OPTIMIZED SCANNING

(71) Applicant: Skyhook Wireless, Inc., Boston, MA (US)

(72) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,456

(22) Filed: Mar. 12, 2018

(65) Prior Publication Data

US 2018/0203092 A1 Jul. 19, 2018

Related U.S. Application Data

(63) Continuation of application No. 15/054,972, filed on Feb. 26, 2016, now Pat. No. 9,915,721, which is a
(Continued)

(51) Int. Cl.
*H04W 4/02* (2018.01)
*G01S 5/02* (2010.01)
(Continued)

(52) U.S. Cl.
CPC .............. *G01S 5/02* (2013.01); *G01S 5/0242* (2013.01); *H04B 7/26* (2013.01); *H04W 4/02* (2013.01); *H04W 64/00* (2013.01); *H04W 84/12* (2013.01)

(58) Field of Classification Search
CPC .... H04B 7/0669; H04B 7/061; H04B 7/0891; H04B 7/0837; H04B 7/2041; H04B 1/715;
(Continued)

(56) References Cited

U.S. PATENT DOCUMENTS 7,768,963 B2 * 8/2010 Alizadeh-Shabdiz .... G01S 5/02
370/328
8,315,233 B2 * 11/2012 Alizadeh-Shabdiz .... G01S 5/02
370/338
(Continued)

*Primary Examiner* — Nimesh Patel
(74) *Attorney, Agent, or Firm* — Cesari and McKenna, LLP; James A. Blanchette

(57) ABSTRACT

In various embodiments, position of a user device is estimated by scanning for WLAN packets transmitted within range of the user device, the scanning to include a plurality of phases which are progressed through until WLAN information sufficient to identify at least a threshold number of WLAN APs is obtained, the plurality of phases including an active scanning phase in which the RF module transmits probe request packets and receives one or more probe response packets, and one or more passive scanning phases in which the RF module listens for one or more packets without first transmitting request packets, extracting WLAN information indicating an identity of one or more WLAN APs from the one or more probe response packets or the one or more listened for packets, and providing the WLAN information to a WPS to obtain an estimate of the position of the user device.

20 Claims, 6 Drawing Sheets

Related U.S. Application Data continuation of application No. 13/892,967, filed on May 13, 2013, now Pat. No. 9,279,877, which is a continuation of application No. 13/680,923, filed on Nov. 19, 2012, now Pat. No. 9,103,900, which is a continuation of application No. 11/774,392, filed on Jul. 6, 2007, now Pat. No. 8,315,233.

(60) Provisional application No. 60/819,182, filed on Jul. 7, 2006.

(51) Int. Cl.
*H04W 64/00* (2009.01)
*H04B 7/26* (2006.01)
*H04W 84/12* (2009.01)

(58) Field of Classification Search
CPC ............... H04L 1/0054; H04L 2209/80; H04L 25/03159; H04L 25/03993; H04L 27/0014; H04L 7/0029; H04L 12/189; H04L 12/18; H04W 4/02; H04W 64/00; H04W 84/12; H04W 88/08; H04W 48/08; H04W 48/16; H04W 48/20; H04W 4/021; H04W 4/028; H04W 52/0225; H04W 36/08; H04W 48/18; H04W 52/245; H04W 8/005; H04W 92/02
See application file for complete search history.

(56) References Cited

U.S. PATENT DOCUMENTS

| | | | |
|---|---|---|---|
| 8,706,140 B2* | 4/2014 | Alizadeh-Shabdiz | .... G01S 5/02 455/456.1 |
| 9,103,900 B2* | 8/2015 | Alizadeh-Shabdiz | .... G01S 5/02 |
| 9,279,877 B2* | 3/2016 | Alizadeh-Shabdiz | .... G01S 5/02 |
| 9,915,721 B2* | 3/2018 | Alizadeh-Shabdiz | .... G01S 5/02 |
| 2004/0087317 A1* | 5/2004 | Caci | .......... G01S 5/021 455/456.1 |
| 2004/0263388 A1* | 12/2004 | Krumm | ................ G01C 21/206 342/451 |
| 2005/0073979 A1* | 4/2005 | Barber | ................ H04L 12/2856 370/338 |
| 2007/0183374 A1* | 8/2007 | Classon | ............ H04W 36/0083 370/338 |

* cited by examiner

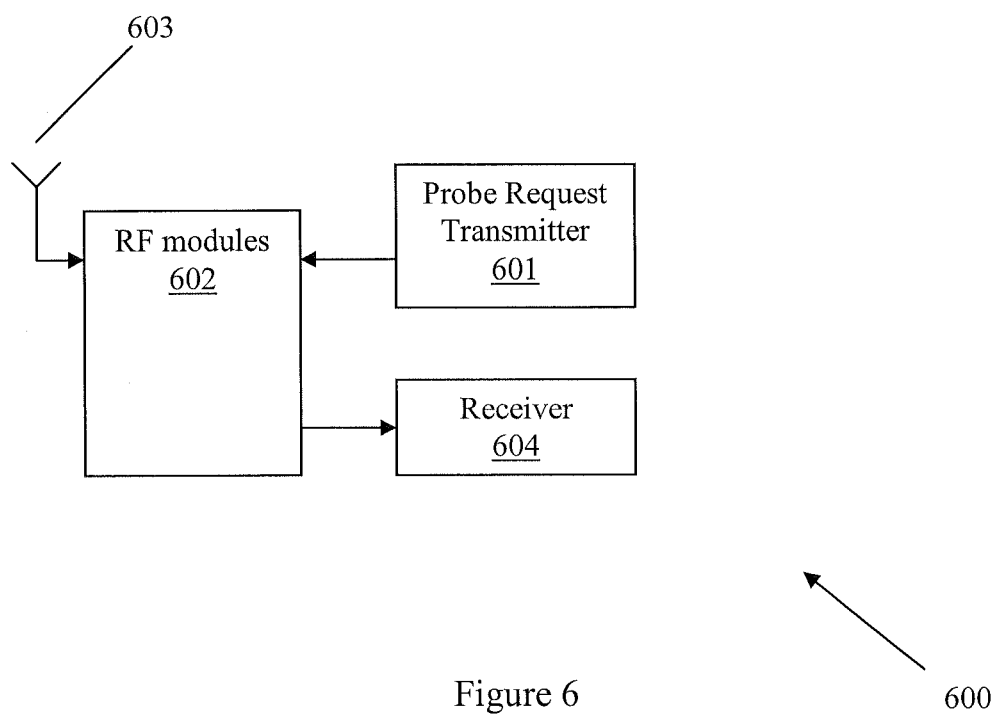
Figure 6                    600

TECHNIQUES FOR ESTIMATING A POSITION OF A USER DEVICE USING OPTIMIZED SCANNING

CROSS-REFERENCE TO RELATED APPLICATIONS

This application is a continuation of U.S. patent application Ser. No. 15/054,972 by Farshid Alizadeh-Shabdiz, entitled Techniques Estimating a Position of a User Device Using a WPS Dedicated Device and Optimized Scanning, filed on Feb. 26, 2016, the contents of which are incorporated by reference herein. U.S. patent application Ser. No. 15/054,972 is a continuation of U.S. patent application Ser. No. 13/892,967 by Farshid Alizadeh-Shabdiz, entitled Techniques for Using Cached Information with a WLAN Positioning System to Obtain an Estimate of a Position of a Mobile Device, filed on May 13, 2013, the contents of which are incorporated by reference herein. U.S. patent application Ser. No. 13/892,967 is a continuation of U.S. patent application Ser. No. 13/680,923 by Farshid Alizadeh-Shabdiz, entitled System and Method of Gathering WLAN Packet Samples to Improve Position Estimates of WLAN Positioning Device, filed on Nov. 19, 2012, the contents of which are incorporated by reference herein. U.S. patent application Ser. No. 13/680,923 is a continuation of U.S. patent application Ser. No. 11/774,392 by Farshid Alizadeh-Shabdiz, entitled System and Method of Gathering WLAN Packet Samples to Improve Position Estimates of WLAN Positioning Device, filed on Jul. 6, 2007, the contents of which are also incorporated by reference herein. U.S. patent application Ser. No. 11/774,392 claims the benefit under 35 U.S.C. § 119(e) of U.S. Provisional Patent Application No. 60/819,182, entitled Use of a Client-Side Receive-Only WLAN Device In a WLAN Positioning System, filed on Jul. 7, 2006, the contents of which are also incorporated by reference herein.

This application is related to the following U.S. applications:

U.S. patent application Ser. No. 11/261,848, entitled Location Beacon Database, filed on Oct. 28, 2005;

U.S. patent application Ser. No. 11/261,898, entitled Server for Updating Location Beacon Database, filed on Oct. 28, 2005;

U.S. patent application Ser. No. 11/261,988, entitled Location-Based Services that Choose Location Algorithms Based on Number of Detected Access Points Within Range of User Device, filed on Oct. 28, 2005;

U.S. patent application Ser. No. 11/261,987, entitled Method and System for Building a Location Beacon Database, filed on Oct. 28, 2005;

U.S. patent application Ser. No. 11/365,540, entitled Encoding and Compressing a WiFi Access Point Database, filed on Mar. 1, 2006;

U.S. patent application Ser. No. 11/562,514, entitled Location Toolbar For Internet Search and Communication, filed on Nov. 22, 2006;

U.S. patent application Ser. No. 11/359,154, entitled Continuous Data Optimization of Existing Access Points In Positioning Systems, filed on Feb. 22, 2006;

U.S. patent application Ser. No. 11/359,144, entitled Continuous Data Optimization of New Access Points In Positioning Systems, filed on Feb. 22, 2006;

U.S. patent application Ser. No. 11/359,271, entitled Continuous Data Optimization by Filtering and Positioning Systems, filed on Feb. 22, 2006;

U.S. patent application Ser. No. 11/430,079, entitled Estimation Of Speed and Direction of Travel In A WLAN Positioning System, filed on May 8, 2006;

U.S. patent application Ser. No. 11/678,301, entitled Methods and Systems For Estimating a User Position In a WLAN Position System Based On User Assigned Access Point Locations, filed on Feb. 23, 2007;

U.S. patent application Ser. No. 11/430,224, entitled Calculation of Quality of WLAN Access Point Characterization for Use In a WLAN Positioning System, filed on May 8, 2006;

U.S. patent application Ser. No. 11/430,222, entitled Estimation of Position Using WLAN Access Point Radio Propagation Characteristics In a WLAN Positioning System, filed on May 8, 2006;

U.S. patent application Ser. No. 11/429,862, entitled Estimation of Speed of Travel Using the Dynamic Signal Strength Variation of Multiple WLAN Access Points, filed on May 8, 2006;

U.S. patent application Ser. No. 11/430,064, entitled Estimation of Speed and Direction of Travel In A WLAN Positioning System Using Multiple Position Estimations, filed on May 8, 2006;

U.S. Provisional Patent Application No. 60/819,218, entitled Methods and Systems for Using WLAN Positioning System in Assisted GPS Systems, filed Jul. 7, 2006;

U.S. Provisional Patent Application No. 60/830,624, entitled Methods and Systems for Using WLAN Positioning System in Assisted GPS Systems, filed on Jul. 13, 2006;

U.S. Provisional Patent Application No. 60/821,479, entitled WLAN Positioning System User Location Pulling Mode for Use in Client-Server Systems, filed on Aug. 4, 2006;

U.S. patent application Ser. No. 11/625,450, entitled System and Method for Estimating Positioning Error within a WLAN Based Positioning System, filed on Jan. 22, 2007;

U.S. patent application Ser. No. 11/696,832, entitled Time Difference of Arrival Based Estimation of Speed in a WLAN Positioning System, filed on Apr. 5, 2007;

U.S. patent application Ser. No. 11/696,833, entitled Time Difference of Arrival Based Estimation of Direction of Travel in a WLAN Positioning System, filed on Apr. 5, 2007;

U.S. patent application Ser. No. 11/774,387, entitled Method and System for Employing a Dedicated Device for Position Estimation by a WLAN Positioning System, filed on Jul. 6, 2007;

U.S. patent application Ser. No. 11/774,395, entitled System and Method of Gathering and Caching WLAN Packet Information to Improve Position Estimates of a WLAN Positioning Device, filed on Jul. 6, 2007;

U.S. patent application Ser. No. 11/774,399, entitled System and Method of Improving Sampling of WLAN Packet Information to Improve Estimates of Doppler Frequency of a WLAN Positioning Device, filed on Jul. 6, 2007; and U.S. patent application Ser. No. 11/774,400, entitled System and Method of Passive and Active Scanning of WLAN-Enabled Access Points to Estimate Position of a WLAN Positioning Device, filed on Jul. 6, 2007.

BACKGROUND OF THE INVENTION

Field of the Invention

The invention generally relates to WLAN-based positioning systems and, more specifically, to methods of using devices specifically dedicated for the collection of WLAN data for use by WLAN-based positioning system to estimate a user's geographic position or optimize operation of the WLAN-enabled device or to gather more samples of WLAN signals to improve position estimates.

Description of Related Art

In recent years the number of mobile computing devices has increased dramatically, creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning algorithms they employ.

The Global Positioning System (GPS) operated by the US Government leverages dozens of orbiting satellites as reference points. Cell tower triangulation is another method used by wireless and cellular carriers to determine a user or device's location. Assisted GPS is another model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of cell towers.

WLAN location system is a new positioning system, which uses WLAN access points to produce location of mobile users. Metro wide WLAN based positioning systems have been explored by a couple of research labs. The most important research efforts in this area have been conducted by PlaceLab (a project sponsored by Microsoft and Intel), University of California San Diego ActiveCampus project (ActiveCampus—Sustaining Educational Communities through Mobile Technology, technical report #CS2002-0714), and the MIT campus wide location system. There is only one commercial metropolitan WLAN based location system in the market at the time of this writing, and it is referred to as WLAN positioning system (WPS) herein.

FIG. 1 depicts a WLAN positioning system based on WiFi signals. The positioning system includes positioning software 103 that resides on a computing device 101. Throughout a particular target geographical area, there are fixed wireless access points 102 that transmit information using control/common channel signals. The client device monitors these transmissions. Each access point contains a unique hardware identifier known as a MAC address. The client positioning software receives transmissions from the 802.11 access points in range and calculates the geographic location of the computing device using characteristics from the radio signals. Those characteristics include the unique identifier of the 802.11 access point, known as the MAC address, Time of Arrival (TOA), and the strengths of the signal reaching the client device. The client software compares the observed 802.11 access points with those in its reference database 104 of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device 101 and determines its geographic coordinates in the form of latitude and longitude readings. Those readings are then fed to location-based applications such as friend finders, local search web sites, fleet management systems and E911 services.

Indoor or outdoor WLAN based positioning systems have leveraged existing off-the-shelf WLAN cards without any modification other than to employ the logic to estimate position.

BRIEF SUMMARY OF THE INVENTION

The invention provides systems and methods of gathering WLAN packet samples to improve position estimates of WLAN positioning device.

Under one aspect of the invention, a device estimates the position of itself in response to gathering wireless signal information from WLAN access points (APs). The device includes a WLAN radio module for receiving WLAN signals transmitted by WLAN APs in range of said device, extraction logic for extracting information from said received WLAN signals to identify the WLAN APs, and logic to cooperate with a WLAN-based positioning system to estimate the position of the device based at least in part on the extracted information identifying the WLAN APs in the range of said device. The extraction logic includes logic to extract information from WLAN signals destined for WLAN-enabled devices other than said device.

Under another aspect of the invention, the WLAN radio module sniffs WLAN packets destined for WLAN devices other than said device, WLAN packets destined for WLAN APs, or WLAN packets originated by WLAN APs.

Under another aspect of the invention, the WLAN radio module receives broadcast packets from said WLAN APs.

Under another aspect of the invention, the radio module includes logic for measuring at least one received signal strength indicator (RSSI) value for the signals received from the WLAN-enabled access points and the logic to cooperate provides said RSSI value to said WLAN-based positioning system.

Under another aspect of the invention, the extraction logic includes logic to gather a diversity of WLAN packets and to combine the diversity to extract WLAN information from the combination to provide to the WLAN-based positioning system.

Under another aspect of the invention, the extraction logic operates at a physical layer of a network protocol and that receives packets at the base data rate of said protocol.

Under another aspect of the invention, a device for estimating the position of itself includes a WLAN radio module for receiving WLAN signals transmitted by WLAN APs in range of said device, extraction logic for extracting information from said received WLAN signals to identify the WLAN APs, and logic to cooperate with a WLAN-based positioning system to estimate the position of the device based at least in part on the extracted information identifying the WLAN APs in the range of said device. The extraction logic includes diversity and combination logic to combine headers of multiple, similar but not identical WLAN packets to form a combined composite packet header with a subset of WLAN packet header fields and from which said extraction logic can identify a WLAN AP involved with the multiple packets.

Under another aspect of the invention, the logic to cooperate provides information to the WLAN-based positioning system to indicate when the extracted information has been derived by diversity and combination logic from packets that individually are detected as erroneous packets.

Under another aspect of the invention, the logic to cooperate provides information to the WLAN-based positioning system to indicate when the extracted information has been derived from packets with error, which packets are also uncorrectable.

Under another aspect of the invention, the logic to cooperate organizes the extracted information based on the type of WLAN packets from which the extracted information was derived and provides the extracted information along with the types of WLAN packets to the WLAN-based positioning system.

Under another aspect of the invention, the diversity and combination logic operates on WLAN packets that failed a Cyclic Redundancy Check of the packet header.

Under another aspect of the invention, the WLAN packets include a plurality of fields and wherein the diversity and combination logic operates on packets for which a subset of the fields have identical information and another subset of fields have different information contained therein.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 6 illustrates the configuration of a device having a dedicated probe request transmitter for gathering WLAN signal information for a WLAN positioning system for estimation of the geographic position of the device.

DETAILED DESCRIPTION OF THE INVENTION

Figure 1:
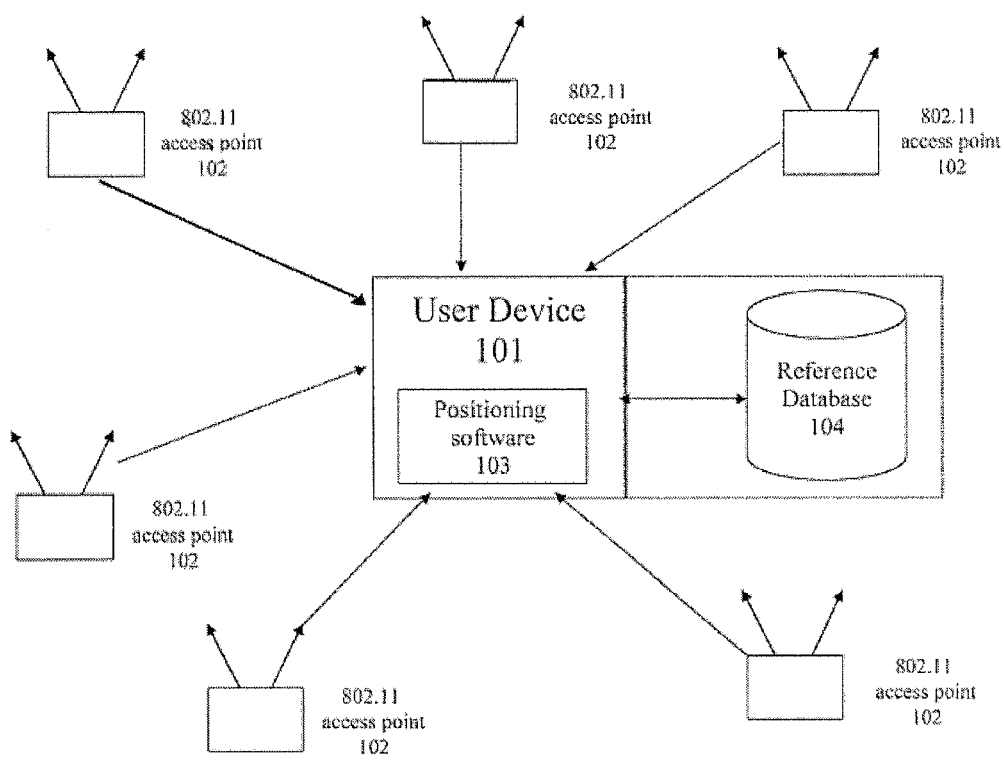
FIG. 1 illustrates a high-level architecture of a WLAN positing system.

Preferred embodiments of the invention provide a dedicated device that gathers wireless signal information for use by clients of a WLAN positioning system (herein "WPS dedicated device" or "dedicated device"). The dedicated device detects WLAN access points (APs) and provides AP signal information to a WPS for use in estimating the position, the velocity, and direction of travel of the device. The dedicated device for use with a WPS is designed to collect information from as many detectable WLAN access point signals as possible, while also minimizing power consumption and device cost.

In one illustrative implementation, the receiver of a WPS dedicated device extracts MAC address from all the packets, including broadcast, multicast, unicast, and data packets, which are detected on the air by the device's receiver to create a list of surrounding APs. That is, even packets with target addresses other than the dedicated device are detected and used to estimate position of the dedicated device. In order to detect WLAN APs surrounding a WPS user, source and destination addresses of packets, both are used. The IEEE 802.11 standard introduced two flags, To DS and From DS, which define the type of MAC addresses in the header. These two flags are used to identify MAC address of AP in the header. If there is no indicator of type of MAC addresses in the header and which one belongs to an AP, all the MAC addresses are extracted and sent to WPS. Automatically, WPS only considers MAC addresses of APs, since only MAC addresses of APs exist in the database of APs. Note that each WLAN device including APs is assigned a unique MAC address. The received signal strength of all the packets can also be measured and reported to the WPS along with the type of the source packet, as explained below, from which the MAC address is extracted. Preferred embodiments send the type of the packet along with the RSSI (Received Signal Strength Indicator) value to the WPS, because the transmit power of some types of packets might not be known by the WPS. While the exact transmit power of some data packets might not be known by the device's receiver, some signals are transmitted at a known power level, e.g., beacon signals are transmitted at the maximum power at all times.

A typical WLAN-enabled device consists of a transmitter, a receiver, and logic to support full duplex communication between the WLAN and the WLAN-enabled device. In a Wireless LAN the media is shared between all the users and users contents to access the media and transmit information. Therefore, each user has to decode all the packets to detect and pick up packets destined to it. The logic of such a WLAN communication device is configured to ignore certain types of signals from WLAN access points (e.g. unicast signals intended for other WLAN devices). In contrast, the dedicated device of preferred embodiments does not ignore any packet and extracts from each packet the MAC address, RSSI, and other information useful to the WPS. The dedicated device does not need many of the transmitter and receiver functions that are present in a typical WLAN communication device. The dedicated device, with logic dedicated solely for use with a WPS, can be constructed more economically due to the reduced hardware and software requirements. Further, the power consumption of such a device can be lower than that of a full duplex device.

The embodiments of the invention described below may be used with the Wi-Fi based location services and methods described in the related applications listed above, which are herein incorporated by reference and with the methods disclosed herein. Those applications taught specific ways to gather high quality location data for Wi-Fi access points so that such data may be used to estimate the geographic position, speed, and bearing of a Wi-Fi-enabled device utilizing such services and techniques of increasing the accuracy of the various estimations.

Generally, as described in greater detail in the incorporated applications, in the WLAN positioning system, the user's WLAN-enabled mobile device scans for WLAN access points in range of the mobile device. The mobile device records information about the access points in range (e.g., the access points' MAC addresses and received signal strengths) and queries a database to receive the access points' geographic positions. This database can reside on the mobile device or it can reside on a central server and accessed remotely. Using the gathered information and the access point positions, the WLAN positioning system estimates the user's geographic position. The techniques of preferred embodiments enable additional signal information to be gathered by the dedicated device. For example, packets that would be ignored under conventional data communication technique are now considered. Likewise, erroneous packets may be used. This additional information enables the WPS to provide improved and/or more accurate position, velocity, and bearing estimate, as described in detail below.

The WLAN positioning system can be implemented on a client-server based architecture, in which the central database resides on a server and there is a need for a connection to the server to determine a client's position. This connection can be implemented, for example, using a WLAN, or other radio signal methods, such as one or more of the various mobile telephone radio standards. In addition, the positioning system can be implemented on a client device with no server interaction, in which case, the various databases, tables and algorithms are located on the dedicated device.

Figure 2:
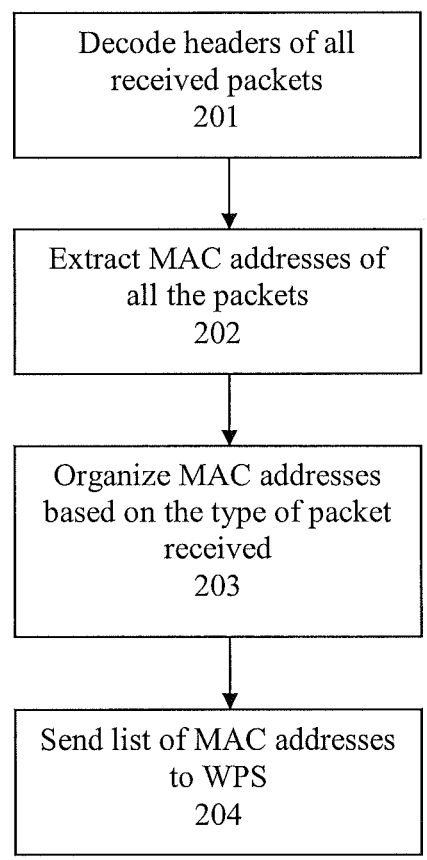
FIG. 2 illustrates a process by which information is extracted from wireless data packets for transmission to a WLAN positioning system.

FIG. 2 illustrates a process by which information is extracted from wireless packets for transmission to a WLAN positioning system. This process can be implemented using a WPS dedicated device without a transmitter. Upon receiving the radio signal from the AP, the physical layer decodes the header of all of the received packets (step 201). The logic then extracts MAC addresses from the packets (step 202) and organizes the MAC addresses based on the type of packet that was received (step 203). For example, the packets may be a broadcast, multicast, or unicast packet. This table of gathered MAC addresses is sent to the WPS as a list of detected APs (step 204), for use by the WPS to estimate the geographic position of the dedicated device using, for example, the techniques disclosed in the above-incorporated applications.

In addition to extracting information from a more diverse selection of packets, the dedicated device can detect weak wireless signal by using diversity and combining multiple packets. Received packets at a weak signal is subject to higher probability of error and if they do not pass CRC check and at least an error is detected in them, using this method, the erroneous packets can be corrected by combing same information of different packets. The word "Diversity" here refers to a concept of combining different packets with some percentage of the same information and reducing probability of error by combining them. For example the received packets may have only different sequence number and other fields remain the same. Note that conventional definition of diversity is receiving multiple copies of the same transmitted packet/information and combining them to improve the reception. There are different known/conventional methods of combining packets, like maximum ratio combining, selective combining, or equal gain combining. Any combining method can be used here to combine the common part of packets. Since the proposed method is based on combining different packets with some percentage of common information, there is a need to identify packets, which can be combined. This is done by finding similarity of the packets and if the similarity is above a threshold, the combining is examined. Thus, while an individual packet may have been unusable (e.g., because of CRC error), the diversity and combining techniques allow these otherwise unusable packet to be used to improve position estimation (e.g., by providing more WLAN signal samples to the WPS).

This method increases receiver sensitivity by combining the header information from multiple packets. By combining the header information from multiple packets, the dedicated device can take advantage of repetitive information in the multiple packets and detect erroneous bits, correct them, and effectively increase the sensitivity of the receiver of the dedicated device. Packets that are received at low power values are subject to a higher probability of error. In a typical WLAN-enabled device, as received power decreases, more and more packets are rejected at the physical layer because of errors in packets. In contrast, when two or more packets originate from the same WLAN AP or are destined to the same WLAN-enabled device (which need not be the dedicated device), the dedicated device combines the information in the packets to detect errors and also correct errors present in the packets.

This technique enables detecting weaker signal from APs. In other words, it increases sensitivity by taking advantage of additional signal information that would otherwise be discarded by a typical WLAN-enabled device. Increasing the number of detected APs improves the accuracy and coverage of the position estimation. In order to detect APs, the dedicated device need only process the packet headers to extract the MAC address. If a series of packets that terminate at the same WLAN device originate from the same WLAN device, or are part of the same session, there is an extensive number of common fields in the headers. By considering multiple packets with common fields, the dedicated device can help to identify the exact error(s) and potentially correct the error(s) in a manner sufficient to at least use the packet information for position estimation.

There are many ways to perform data correction. In general, all of the methods use common information transmitted in the series of packets to identify the errors and correct them. For example, by receiving two copies of the same packet, the device can identify discrepancies between the two and possibly correct those errors. Even if the errors cannot be corrected, identifying an erroneous part of a header can be used to ensure that the MAC addresses are correct. Note that the headers of 802.11 packets are protected using CRC (Cyclic Redundancy Check) techniques. Therefore, CRC checking used to detect errors.

In addition to the implementation described above, the WPS dedicated device includes the MAC address extracted from headers containing errors, which cannot be corrected after applying any method, in the list of detected APs, along with a flag indicating that the addresses were extracted from erroneous packets. Therefore, the list of detected APs sent to the WPS includes a list of AP MAC addresses extracted from packets without error and a list of AP MAC addresses extracted from packets with error. Thus, the WPS can use the information associated with packets containing errors in such a way as to allow for the fact that the information may be incorrect. Increasing the number of detected APs improves the accuracy and coverage of the position estimation.

Figure 3:
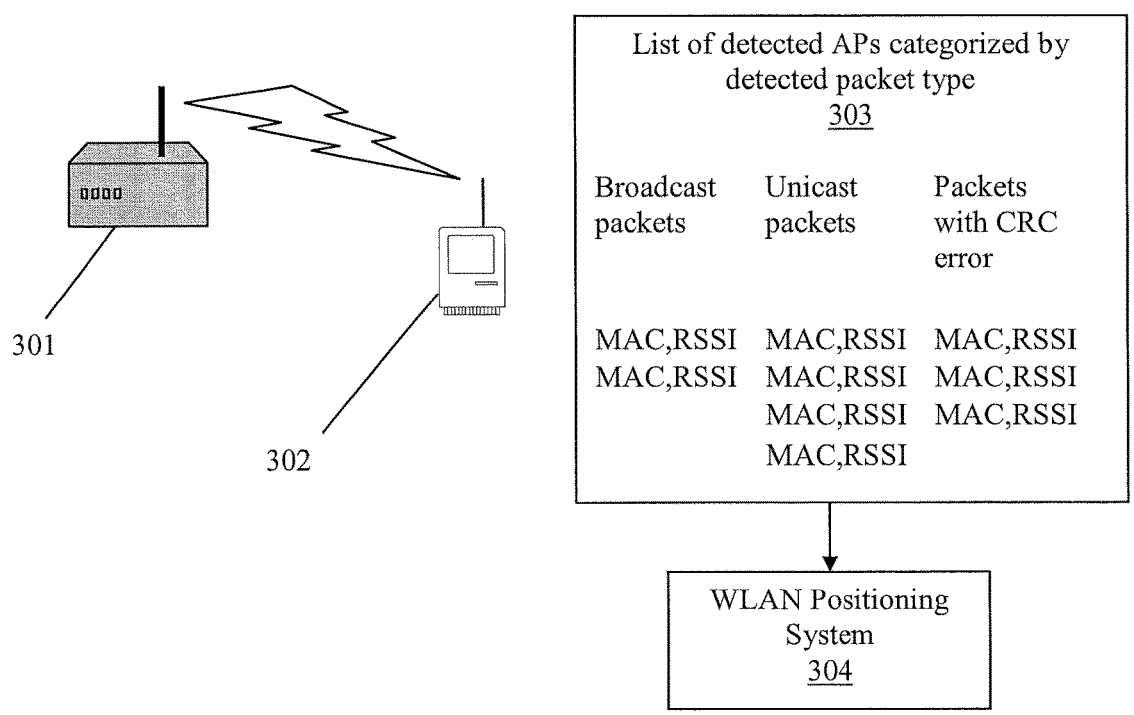
FIG. 3 illustrates information gathered by a dedicated device for use by a WLAN positioning system.

FIG. 3 illustrates information gathered by a WPS dedicated device for use by a WLAN positioning system. An access point 301 transmits signals containing its MAC address. Mobile device 302 contains a WPS dedicated device. The dedicated device gathers information from APs in range, including access point 301, and generates a list of detected APs 303. This list is sent to a WPS 304. The list of detected APs 303 contains MAC addresses, and optionally, Received Signal Strength Indication values. The entries in the list are categorized based on the type of packet that was the source of the MAC address (e.g., broadcast, multicast, or unicast) and whether or not the dedicated device detected any CRC errors. This list is sent to a WLAN positioning system 304 to estimate the device's position.

Figure 4:
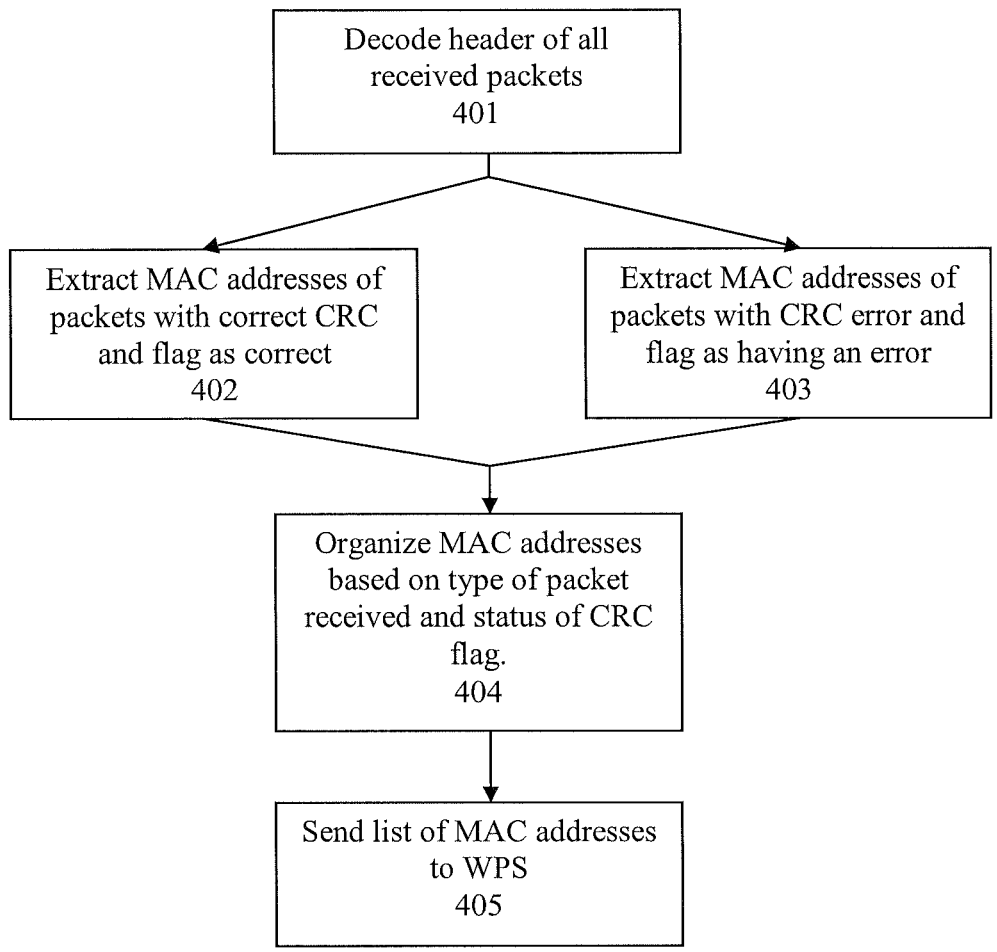
FIG. 4 illustrates a process by which packet errors are identified in information that is extracted from wireless data packets.

FIG. 4 illustrates a process by which packet errors are identified in information that is extracted from WLAN packets. In the initial step, all detectable packets are captured, and each packet's header is decoded (step 401). As the MAC address of the AP originating the packet is extracted from the header, packets passing a CRC check are flagged with a correct flag (step 402), while packets failing a CRC check are flagged with an error flag (step 403). Next, all of the MAC addresses are organized based on the type of packet that was the source of the MAC address (e.g., broadcast, multicast, or unicast) and on whether or not the packet passed the CRC check (step 404). Finally, the list is sent to a WLAN positioning system to estimate the device's position (step 405).

The WPS dedicated device only needs to read headers of the packets in order to extract MAC address of APs. Therefore, the receiver of the dedicated device needs only be equipped with corresponding physical layer to decode headers. For example, because headers are transmitted at the base rate, a WPS dedicated device need to decode the base rate. The base rate is a transmission rate that is common between different versions of the WLAN standards. For example, the IEEE 802.11 standard provides multiple options at the physical layer to extend the data rate to 11 Mbps for version 'b' and 54 Mbps for version 'a' and 'g' of the standard. However, the header of these packets are always transmitted at the base rate of 1 Mbps. A more accurate measurement of RSSI increases the accuracy of the estimation of position, velocity, and direction of travel (using, for example, the techniques disclosed in the incorporated applications). However, measuring the RSSI of the packets is not essential for operation of the WPS. For example, the WPS can assume a nominal power value for the packets without the power measurement and can estimate the position of the mobile devices based on the nominal power value.

Under an alternate embodiment, a receive-only WPS dedicated device is provided that gathers WLAN access point signal information in a passive manner (i.e., the device receives signals without the need to first transmit a request). In general, to enable a WPS to estimate the position of a client device, the client device must detect WLAN access points in the vicinity and, optionally, measure the RSSI values associated with each detected AP. The receive-only WPS dedicated device detects WLAN access points as discussed in the incorporated applications and may also detect packets by sniffing packets originated by APs destined to other WLAN-enabled devices or by receiving broadcast packets transmitted by the WLAN access points. The sniffing and broadcast techniques are particularly useful for receive-only devices as they lack a transmitter and cannot instigate an AP reply or response. After sniffing a packet or receiving a broadcast packet, the receive-only WPS dedicated device need only read the MAC address of the AP embedded in the header of the packet and, optionally, measure the associated signal power of the packet.

Power consumption of the WPS dedicated device can be minimized by minimizing duration of time that the receiver is active. The WPS dedicated device of preferred embodiments is in low-power consumption mode (e.g. standby mode) and is activated when a packet is detected on the wireless media. Moreover, it is only activated for the duration of header size. The WPS dedicated device only needs to receive the header and decode it and may ignore rest of the packet. The WPS dedicated device can be equipped with a simple carrier sense module, which detects any activity on the WLAN channels. The carrier sense module has low power consumption compared to the WLAN receiver module. The WLAN receiver module can be optimized for WPS to only extract the MAC addresses of detected APs and, optionally, to estimate the associated RSSI value of the received signal. Upon receiving a request for a position estimate, the device causes the carrier sense module to monitor WLAN channels for signal activity. When the carrier sense module detects any activity, it changes the receiver module to active mode, which reads the packet header and extracts the MAC addresses of WLAN APs.

In addition, the carrier sense module can be designed with passive electronic components to minimize power consumption. Furthermore, the carrier sense module can be designed to operate at the RF band to eliminate the need for down conversions of the radio frequency to the processor frequency. Thus, any part of the receiver circuit that is not needed for carrier sensing can remain in a low power consumption mode (for example, a standby mode) until needed. At which time, the carrier sense module activates the receiver circuit upon detecting a packet on any channel.

Figure 5:
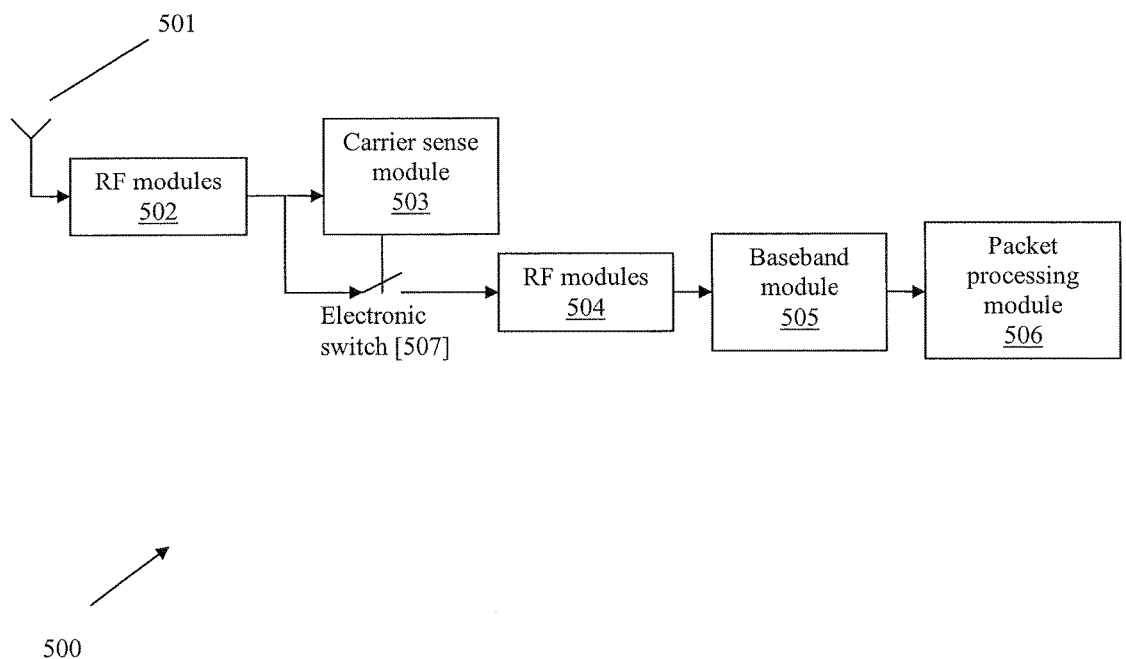
FIG. 5 illustrates the configuration of a dedicated device for gathering WLAN signal information for a WLAN positioning system for estimation of the geographic position of the device.

FIG. 5 illustrates a configuration of a receive-only WPS dedicated device 500 for gathering WLAN signal information for a WLAN positioning system for estimation of the geographic position of the device. The device 500 has an antenna 501 and RF modules 502, or parts of an RF module that are needed only to detect a carrier, and a carrier sense module 503 to detect any activity on the WLAN channels. The device 500 also includes any other RF modules 504 that are required for WLAN signal processing, a baseband module 505, and a packet processing module 506 that processes the packet header and extracts the MAC address and associated RSSI values of the signals.

The RF modules 504 required for WLAN signal processing, the baseband module 505, and the packet processing module 506 are needed only upon detection of a WLAN signal. Thus, these modules are maintained in a low power consumption mode (e.g., a sleep mode). When the carrier sense module 503 detects any activity on a WLAN channel, the carrier sense module 503 changes all of the other modules to an active mode via power mode control connections 508. Also upon detection of a packet on the channel, the carrier sense module 503 also routes the signal from the RF modules 502 to the rest of the receiver modules via electronic switch 507 to decode the header of the packet.

A "Beacon Detector" is one illustrative implementation of a receive-only WPS dedicated device. A beacon is a signal that is broadcast by WLAN access points periodically and includes the MAC address of the access point. Thus, a Beacon Detector is a simple receive-only device that extracts the MAC address and, optionally, calculates the associated RSSI values, from the beacon signals.

In another embodiment of the invention, a WPS dedicated device is provided that includes a transmitter and a receiver that are optimized for use in a WPS. In order to detect the WLAN access points in the vicinity and the associated RSSI values, the dedicated device actively probes WLAN APs by broadcasting a probe request message and receiving probe response from the WLAN APs in range. While "probe response" and "probe request" refer to specific messages in the IEEE 802.11 standard, embodiments of the invention also encompass the general concept of active scanning for any WLAN access points. Active scanning is a quick and power efficient way of detecting WLAN APs because the duration of scanning is short and the radio modules in the device are powered on for only a short period of time, thereby consuming less power.

FIG. 6 illustrates one possible implementation of a WPS dedicated device 600 in which the transmitter of the dedicated device is designed to transmit only the probe request message. This greatly simplifies the configuration of the transmitter. For example, the base band modules of the transmitter can be eliminated. Likewise, because the transmitter is designed to only transmit a pre-defined probe request packet, much of the software that would otherwise be required to control the transmitter can be eliminated. In this illustrative implementation, the probe request packet is pre-generated and stored in a probe request transmitter module 601. Upon receiving a command to perform active scanning, the probe request packet can be fed to RF modules 602 directly. The RF modules 602 transmit the probe request to surrounding WLAN APs via an antenna 603.

The WLAN APs in range respond with probe responses, which are passed by the antenna 603 and RF modules 602 to a dedicated receiver module 604. The receiver module 604 extracts the MAC addresses from the probe responses and calculates the associated RSSI values. The receiver module 604 does not need to be able to decode any other message except the probe responses. The IEEE 802.11 standard probe responses and probe requests are transmitted at the base rate. Thus, the probe request transmitter module 601, RF modules 602, and receiver 604 need only support physical layer of probe request and probe response. Optionally, the receiver design can be extended to read all of the header files of all the packets on the air, as described above, and compose a list of the MAC addressed and RSSI values of the detected APs. In such an implementation, the dedicated device has the dual benefits of being able to gather information from surrounding WLAN AP on demand as well as being able to extract information from any detectable WLAN radio signal on the air. The device may then consult a local database to perform position estimation or use other forms of up-links to a remote database (e.g., cellular link).

The typical approach for known WPS-enabled devices is to leverage existing WLAN transceivers embedded in (or added to) clients' devices (e.g., laptop, PDA, or cell phones). However, as described above, a WPS-enabled device of preferred embodiments does not require all of the functionality of a typical WLAN card in order to gather WLAN AP signal information. When a user's device is not equipped with a typical WLAN card, a WPS dedicated device can be added to the user device (laptop, cell phone, or PDA) to make it WPS-enabled. Thus, one potential application of embodiments of the invention is to WPS-enable devices that are not equipped with a standard off-the-shelf WLAN transceiver. This can be achieved by adding a WPS dedicated device to user devices or by integrating a WPS dedicated device into general purpose integrated circuits. For example, GPS devices, laptops, PDAs, and mobile telephones can be WPS-enabled by including a WPS dedicated device into the microprocessors and/or chipsets of these devices.

Embodiments of the invention address some of the main issues of integration with any mobile device general-purpose chipsets (e.g., GPS or microprocessors). Two general issues that apply in nearly all integration cases are price and power consumption. In addition, embodiments of the invention also address specific issues that arise in the integration of WLAN transceivers into specific devices. For example, WLAN transceivers can cause interference with GPS devices. By eliminating the transmitter or limiting the use of the transmitter, both as described above, potential interference is reduced or eliminated. Likewise, by employing the techniques disclosed herein, hardware cost and power consumption can be reduced. Furthermore, when integrating a WPS dedicated device into a GPS receiver, the GPS and WPS dedicated device can share receiver hardware. For example, the receivers can share the antenna and/or local oscillators.

A WPS dedicated device can be purpose-built, or it can be built by using an off-the-shelf WLAN card. In the later case, the unnecessary modules and devices are not populated. In an alternate configuration, the hardware of a standard off-the-shelf WLAN card is fully populated, but unnecessary modules are disabled. In yet a further configuration, a typical off-the-shelf WLAN-enabled device is customized for use with a WPS. In such a case, the application programming interface of the off-the-shelf interface is customized to perform the techniques described above. For example, as described below, the WLAN-enabled device can be instructed to detect as many WLAN APs as possible, perform extra signal measurements, and/or expose some of the signal measurement to the WPS to increase the accuracy of position, velocity, and direction of travel estimates.

Under another embodiment of the invention, the scanning process of a WLAN-enabled device can be optimized by combining passive and active scanning.

Passive and active scanning is part of the IEEE 802.11 standard. Hybrid scanning is proposed by some WLAN device manufacturers, which is described as an active scan followed by a passive scan of all the channels or an active scan followed by a passive scan of the channel operating on. Upon receiving a request to perform scanning, the WLAN-enabled device performs active scanning on all the channels, followed by passive scanning. Passive scanning can be performed on the most used channels. For example, for IEEE 802.11 use in the United States, passive scanning can be performed on channels one, six, and eleven, as these are the most popular channels. Furthermore, for the IEEE 802.11 standard implementation in the 2.4 GHz spectrum, twenty six MHz channels are overlapped and separated only by 5 MHz. Therefore, more than one channel can be scanned at a time for passive and active scanning. The RF hardware can be designed, using known methods, to enable the device to scan more than one channel at a time. For example, the RF filters can be made to have a wider bandwidth to enable the signal of more than one channel to pass. If scanning process is divided to steps, which are active scanning, passive scanning of the most used WLAN channels and passive scanning of all the channels, scanning can be further optimized based on the result of each step of scanning. In other words, scanning can be stopped after each step, if number of returned APs is sufficient to estimate location of the end user. There is a balance between the minimum number of required APs to estimate location of an end user and power consumption. Increasing the minimum number of required APs to estimate location of an end user, increases probability of scanning more steps and consume more power, but it increases overall accuracy of the end user.

Under an extension of the above embodiment of the invention, the process of scanning of WLAN APs surrounding a WLAN-enabled device is optimized based on the status of the WLAN-enabled device. The goal is minimizing power consumption due to scanning for localization of the WLAN-enabled device by using information of the status of the WLAN-enabled device. For example, if WLAN-enabled device is in low-power consumption mode and not associated with any AP, active scanning can be used which is short and the device can go back to low power consumption mode quickly. If WLAN-enabled device is in low-power consumption mode but it is associated with an AP and goes to active mode periodically as part of normal operation of the device, the scanning for localization can be performed at the same time that the WLAN-enabled device is activated for other reasons. Tying scanning for localization and other activities can also be conditioned to a maximum time difference between the events. In other words, if the time of request to scan for localization and other activities are more than a time threshold, they can schedule independently, otherwise they can be tied together and happen at the same time. If a WLAN-enabled device is active and it is associated with an AP, active scanning followed by passive scanning can be performed, since the WLAN device is active anyway. The word "Association" is introduced in the IEEE 802.11 standard and it means a logic connection is established between the WLAN-enabled device and a WLAN AP.

Under another embodiment of the invention, WLAN device logs any detected AP and time tags it for the last given period of time or up to the maximum number of recent detected WLAN access points, locally.

In the normal operation of a typical WLAN-enabled device, the device decodes packets to determine if the packets are intended for the device or decodes beacon broadcast signal; MAC address of surrounding APs can be extracted from decoded packets or beacon signals, but they are ignored or not saved for later use. By modifying the WLAN enabled device the list of detected APs along with the time of detection is saved locally.

Then, at a future time, the cached information can be sent to a WPS, along with a time tag indicating the time of detection, in response to a request for a position estimate. Storing history of detected APs is used to increase accuracy of position, velocity, and direction of travel estimation and it also increases coverage in the case that the most recent scan does not return any AP in the database.

The cached information and associated time tags enable the WPS to take advantage of the history of the movement of the user, to track the user, and to increase the accuracy of position, velocity, and direction of travel estimates. In addition, if the WLAN-enabled device cannot detect any APs when an AP scanning request is received, the cached signal information can be used to predict a later position of WPS-enabled device.

In a navigation system, two classes of position estimation are introduced, namely position of an end user can be estimated with or without history of movement. Without history is a single shot estimation and it is based on instantaneous received signal. It is a one time estimation of position of end user. With history of movement, past history of location of user and pattern of user movement is known to the system and current location of the user is not based solely on instantaneous view of the signal, but instead also considers all the previous history of movement. This is also called position estimation with tracking. Accuracy of estimation in case of using history of movement is higher than one shot estimation. History of movement can also be used to predict location of user at future time. Therefore, the predicted location can be reported if there is no signal available to locate user at the current time and improve coverage of positioning system.

Under another embodiment of the invention, multiple RSSI samples are provide for each packet. Each packet is divided into multiple segments and RSSI is measured for each segment, separately. These RSSI values are used to estimate Doppler frequency reference to each AP using known methods. For example, the bandwidth of the power spectral density of the distribution of power variation due to multi-path is equal to the Doppler frequency for Rayleigh and Rician distribution. As in known, in order to estimate the bandwidth of power spectral density of a Rayleigh or a Rician distribution, ideally, a number of power samples should satisfy the Nyquist sampling theorem. Approaching the ideal Nyquist sampling rate increases the accuracy of Doppler estimation. Therefore, the power sampling rate can be a limiting factor on the maximum Doppler frequency that can be measured in this way. The WPS dedicated device and the techniques described above enable an increase in the sampling rate of the power distribution by providing power readings for each packet it detects and/or by providing multiple power readings for a given packet (e.g., one power reading associated with the first half of the packet and another power reading associated with the second half of the packet). The RSSI values of each AP are considered separate from other AP RSSI values.

There are extensive work and research in estimating Doppler frequency based on power variation over time. No known WLAN based positioning system uses these methods to estimate Doppler frequency, because power samples provided by a WLAN enabled device is not frequent enough to estimate higher frequencies. Therefore, this method with off-the-shelf WLAN card can be used to estimate very small Doppler frequencies or very small speeds, but in order to cover entire range of practical user velocities, there is a need for more power samples per second.

As explained above, the various embodiments and implementations of the invention can collect values of carrier frequency along with the information contained in the received packets and pass them to the WPS engine to estimate position, velocity, and bearing.

It will be appreciated that the scope of the present invention is not limited to the above-described embodiments, but rather is defined by the appended claims, and these claims will encompass modifications of and improvements to what has been described. For example, embodiments have been described as having a client-server architecture. However, embodiments of the invention can be implemented in the user's mobile device, in which the mobile device contains the access point location data and performs all techniques needed to determine the user's location.

What is claimed is:

1. A method for estimating a position of a user device, comprising:

scanning, by a radio frequency (RF) module of the user device, for wireless local area network (WLAN) packets transmitted within range of the user device, the scanning to include a plurality of phases which are progressed through until WLAN information that identifies at least a threshold number of WLAN access points (APs) is obtained and then scanning is ceased, the plurality of phases including an active scanning phase in which the RF module transmits probe request packets and receives one or more probe response packets, and one or more passive scanning phases in which the RF module listens for one or more packets without first transmitting request packets;

extracting WLAN information indicating an identity of one or more WLAN APs from the one or more probe response packets or the one or more listened for packets; and providing the WLAN information indicating the identity of the one or more WLAN APs to a WLAN positioning system (WPS) to obtain an estimate of the position of the user device.

2. The method of claim 1, wherein the one or more passive scanning phases include a passive scanning phase of a subset of all WLAN channels provided by a WLAN protocol and a passive scanning phase of all WLAN channels provided by the WLAN protocol.

3. The method of claim 1, wherein the threshold number of WLAN APs is greater than a minimum number of WLAN APs required by the WPS to estimate the position of the user device.

4. The method of claim 1, wherein the user device is a limited-transmission device that is only capable of transmitting a predefined subset of WLAN packets supported by a WLAN protocol.

5. The method of claim 4, wherein the predefined subset of WLAN packets includes probe request packets.

6. The method of claim 4, wherein the limited-transmission device is only capable of receiving a second predefined subset of WLAN packets supported by the WLAN protocol.

7. The method of claim 6, wherein the second predefined subset of WLAN packets includes probe response packets.

8. The method of claim 1, wherein the probe request packets are pre-generated and stored on the user device, and transmission of probe request packets comprises providing the pre-generated probe-response packets to the RF module.

9. A method for estimating a position of a user device, comprising:
scanning, by a radio frequency (RF) module of the user device, for wireless local area network (WLAN) packets transmitted within range of the user device, the RF module having a RF filter bandwidth that allows WLAN packets on multiple WLAN channels of a WLAN protocol to simultaneously pass;
extracting WLAN information indicating an identity of one or more WLAN APs from the WLAN packets simultaneously passed by the RF filter; and
providing the WLAN information indicating the identity of the one or more WLAN APs to a WPS to obtain an estimate of the position of the user device.

10. The method of claim 9, wherein the scanning using the RF module having the RF filter bandwidth that allows WLAN packets on multiple WLAN channels to simultaneously pass includes passive scanning.

11. A method for estimating a position of a user device, comprising:
determining a power-consumption mode and a wireless local area network access point (AP) association status of the user device;
based on the power-consumption mode and the association status, performing at least one of active scanning in which the RF module transmits probe request packets and receives one or more probe response packets or passive scanning in which the RF module listens for one or more packets without first transmitting request packets;

extracting WLAN information indicating an identity of one or more WLAN APs from the one or more probe response packets or the one or more listened for packets; and providing the WLAN information indicating the identity of the one or more WLAN APs to a WLAN positioning system (WPS) to obtain an estimate of the position of the user device.

12. The method of claim 11, wherein the active scanning is performed in response to determining the user device is in a low-power consumption mode and not associated with any WLAN AP.

13. The method of claim 11, wherein the active scanning and the passive scanning are both performed in response to determining the user device is in an active mode and not associated a WLAN AP, wherein the active scanning is performed first and followed by the passive scanning.

14. A system configured to estimate a position of a user device, comprising:
a user device including
one or more radio frequency (RF) modules configured to scan for wireless local area network (WLAN) packets transmitted within range of the user device, the scanning to include a plurality of phases which are utilized until a condition is met, the plurality of phases including an active scanning phase in which the RF module transmits probe request packets and receives one or more probe response packets, and one or more passive scanning phases in which the RF module listens for one or more packets without first transmitting request packets, and
a packet processing module configured to extract WLAN information indicating an identity of one or more WLAN APs from the one or more probe response packets or the one or more listened for packets; and
a WPS executing at least in part on the user device or a server that is accessible to the user device, the WPS configured to take the identity of the one or more WLAN APs, compare the identity of the one or more WLAN APs to a reference database, and based on the comparison estimate a position of the user device.

15. The system of claim 14, wherein the condition is that WLAN information that identifies at least a threshold number of WLAN access points (APs) has been obtained.

16. The system of claim 15, wherein the threshold number of WLAN APs is greater than a minimum number of WLAN APs required by the WPS to estimate the position of the user device.

17. The system of claim 14, wherein the one or more passive scanning phases include a passive scanning phase of a subset of all WLAN channels provided by a WLAN protocol and a passive scanning phase of all WLAN channels provided by the WLAN protocol.

18. The system of claim 14, wherein the user device is a limited-transmission device that is only capable of transmitting a predefined subset of WLAN packets supported by a WLAN protocol.

19. The system of claim 14, wherein the limited-transmission device is only capable of receiving a second predefined subset of WLAN packets supported by the WLAN protocol.

20. The system of claim 14, wherein a phase to utilize of the plurality of phases is selected in response to a power-consumption mode and the association status of the user device.

* * * * *